United States Patent [19]

Yazvac

[11] Patent Number: 4,683,517
[45] Date of Patent: Jul. 28, 1987

[54] INTEGRATED LIGHTING PANELBOARD AND WIRING GUTTER ASSEMBLY

[75] Inventor: Thomas A. Yazvac, Simsbury, Conn.
[73] Assignee: General Electric Company, New York, N.Y.
[21] Appl. No.: 907,248
[22] Filed: Sep. 15, 1986
[51] Int. Cl.⁴ .............................................. H02B 1/04
[52] U.S. Cl. .................................... 361/358; 361/359; 361/378; 361/428
[58] Field of Search ............... 361/355, 359, 358, 362, 361/363, 378, 428

[56] References Cited

U.S. PATENT DOCUMENTS

| Re. 23,797 | 3/1954 | Miller | 361/358 |
| 3,983,311 | 9/1976 | Brumfield et al. | 174/50 |
| 4,517,623 | 5/1985 | Barner et al. | 361/358 |
| 4,631,634 | 12/1986 | Raabe | 361/358 |

Primary Examiner—Roy N. Envall, Jr.
Attorney, Agent, or Firm—Richard A. Menelly; Walter C. Bernkopf; Fred Jacob

[57] ABSTRACT

An integrated circuit breaker lighting panelboard and wiring gutter assembly allows the circuit breakers and the power system wiring cables to be housed within a common enclosure. A pair of keyed trim plates can be optionally mounted on either side of the lighting panelboard access door to provide a large wiring cable gutter on one side of the enclosure. Alternatively, one of the keyed trim plates can be mounted on each side of the lighting panelboard access door for a smaller wiring cable gutter on each side.

8 Claims, 6 Drawing Figures

INTEGRATED LIGHTING PANELBOARD AND WIRING GUTTER ASSEMBLY

BACKGROUND OF THE INVENTION

When lighting panelboards containing a plurality of industrial rated circuit breakers are used within multistory buildings, one such lighting panelboard is often required for each floor. To faciliate electrical connection with the circuit breakers within the panelboards, an auxiliary wiring cable chase or gutter is attached to the lighting panelboard enclosure. The installation is usually done by an electrical contractor prior to delivery to the installation site and each such gutter is customized to fit the specific lighting panelboard requirement.

U.S. Pat. No. 3,983,311, entitled "Auxiliary Gutter With Lay-In End Walls And Universal Cover", describes one example of an auxiliary gutter which can be attached to a load center on site by means of auxiliary tap kits.

U.S. Pat. No. 4,631,634, entitled "Lighting Circuit Breaker Panelboard Modular Assembly", describes a circuit breaker panelboard modular assembly fabricated from a plurality of interdependent molded plastic and metal parts to adapt breakers of different ratings within a common panelboard enclosure. This patent application describes the arrangement of the lighting panelboard interior and should be reviewed for a good description thereof. The instant invention allows the lighting panelboard described therein to be integrated with the wiring cable gutter within a common enclosure.

SUMMARY OF THE INVENTION

An integrated lighting panelboard and gutter assembly permits the wiring cables and the circuit breakers to be housed within a common modular enclosure. A pair of keyed trim plates in cooperation with the lighting panelboard door allows the gutter to be assembled in one of three modular arrangements. A steel shield assembly is provided as an optional barrier to provide for a separate wireway or riser barrier within the enclosure.

DESCRIPTION OF THE PREFERRED EMBODIMENT

Figure 1:
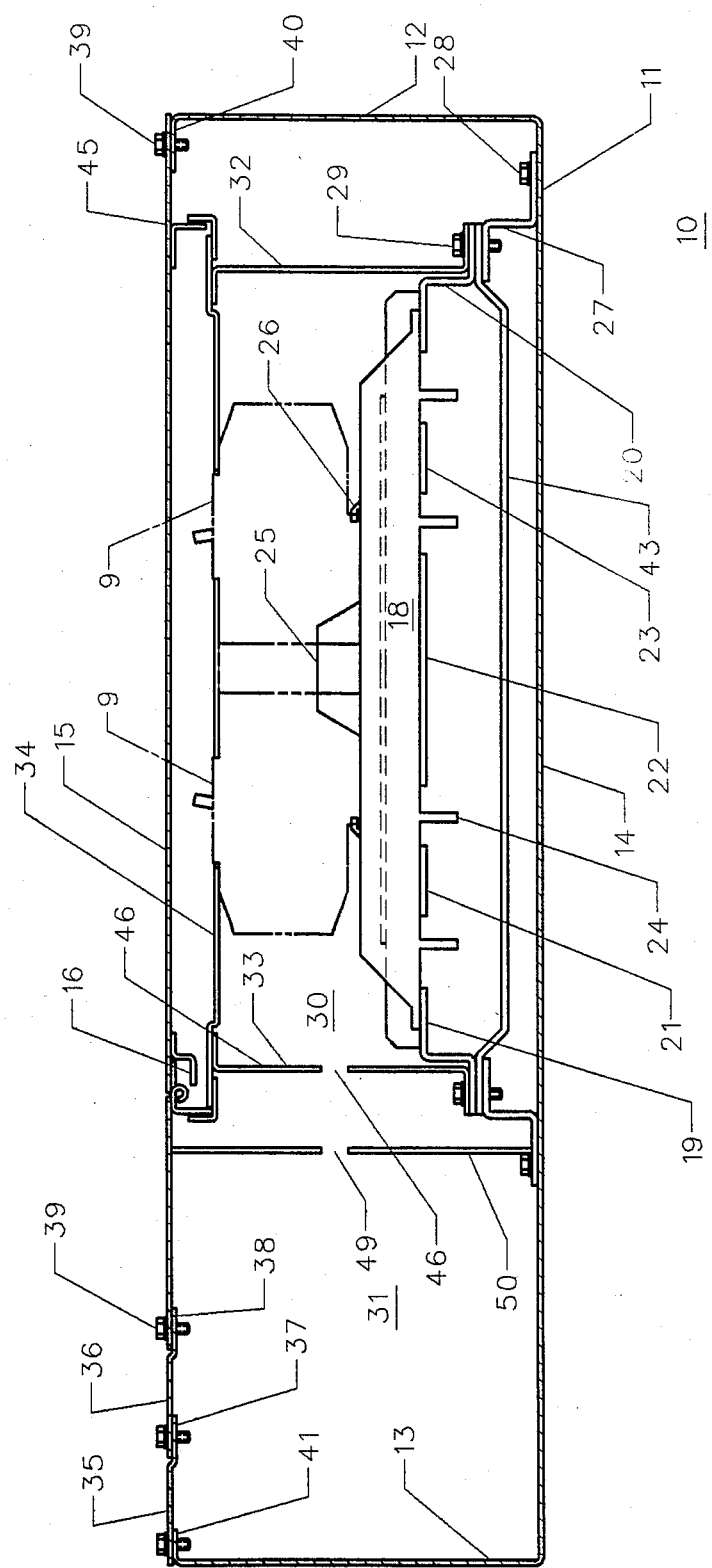
FIG. 1 is a side view of the integrated lighting panelboard and gutter assembly, according to the invention.

The integrated lighting panelboard and gutter assembly 10 shown in FIG. 1 basically comprises a modular enclosure 11 formed from a metal stamping into a pair of upstanding sidewalls 12, 13 and a bottom 14. An angled rim 40 is formed along the top of sidewall 12 and a corresponding rim 41 is formed along the top of sidewall 13. The circuit breaker interior 30 is defined within a pair of shield supports 32, 33 which are attached to a bottom pan 43 by means of bolts 29. The bottom pan, in turn, is attached to the bottom of the modular enclosure by means of support brackets 27 and bolts 29. The circuit breaker mounting base 18 is supported by a pair of side rails 19, 20 and is positioned over the 3-phase main bus bars 21-23, which are connected with the three main power cables within the electrical distribution system (not shown). A plurality of industrial rated circuit breakers 9 are supported by means of corresponding circuit breaker support hooks 26 integrally formed within the mounting base and are electrically isolated by means of a plurality of baffles 25 integrally formed within the mounting base. As described within the referenced U.S. Pat. No. 4,631,634, a plurality of bus bar baffles 24 extend from the bottom of the mounting base to electrically isolate the main bus bars 21-23. A protective shield 34, supported by means of shield supports 32, 33, prevents access to the interior when the lighting panelboard door 15 is opened. The door is supported on a hinge 16, which is welded to the sheet metal door flange 45 that surrounds and supports the door. Adjacent the circuit breaker interior 30 is a gutter interior 31 integrally formed within the modular enclosure 11. The gutter interior is isolated by means of a pair of keyed trim plates 35, 36, each having a planar edge and an offset edge which attach at one side to the enclosure rim 41 and at the opposite side to the door flange 45. The keying between the keyed plates, door flange and modular enclosure is provided by the arrangement of spaced holes 35A-35D, 45A-45D, 40A, 40B, and 41A, 41B, shown in FIG. 4. The keyed trim plates are bolted together at the overlap formed between the offset edge 37 of keyed trim plate 35 and the planar edge of trim plate 36, as seen by referring again to FIG. 1. To provide a flush relationship with respect to the surface of door 15, the offset edge 38 of trim plate 36 is overlapped by the door flange 45 and bolted to the door flange by means of a bolt 39, as indicated. The gutter interior 31 houses the electrical distribution cables which connect with the main bus bars 21-23 by means of an opening 46 through shield support 33. A riser barrier 50 with a wiring access opening 49 is attached to the bottom of the enclosure for electrical isolation between the gutter interior 31 and the circuit breaker interior 30.

Figure 2:
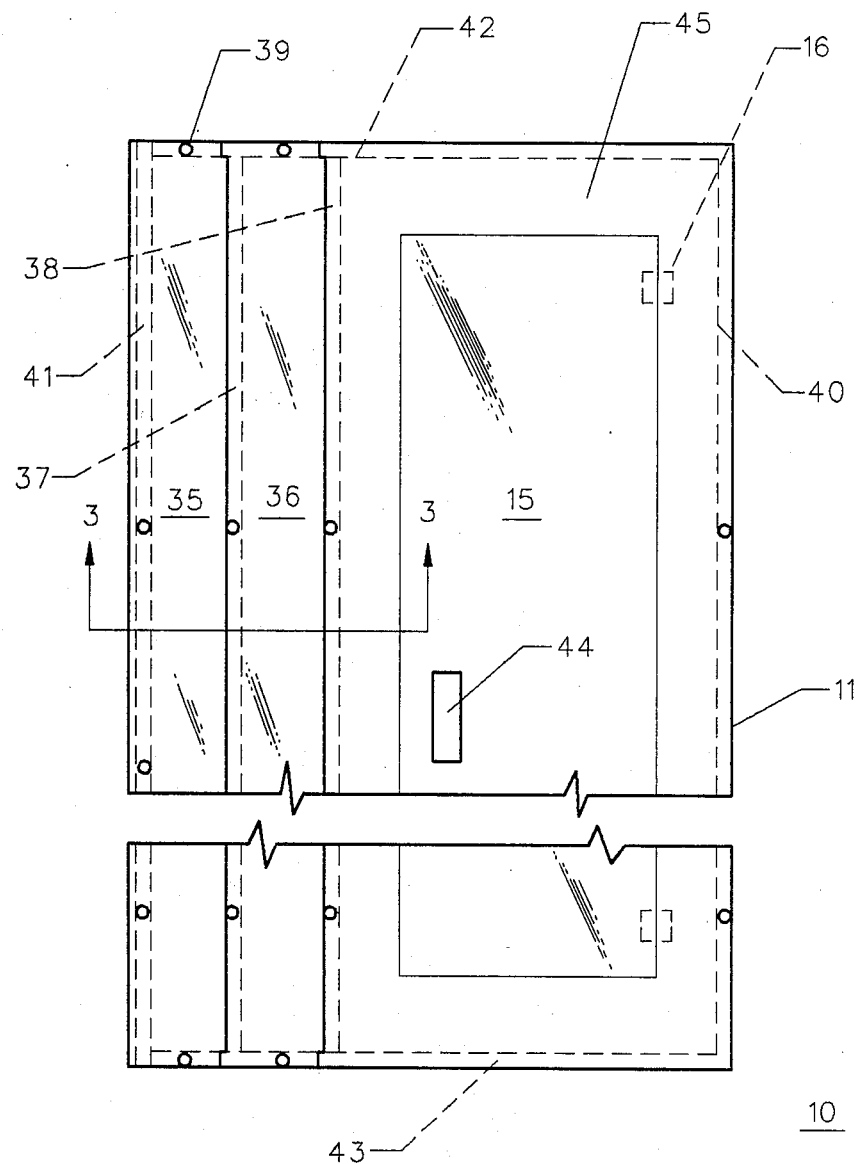
FIG. 2 is a front view of a first arrangement of the integrated lighting panelboard and gutter assembly of FIG. 1.
Figure 3:
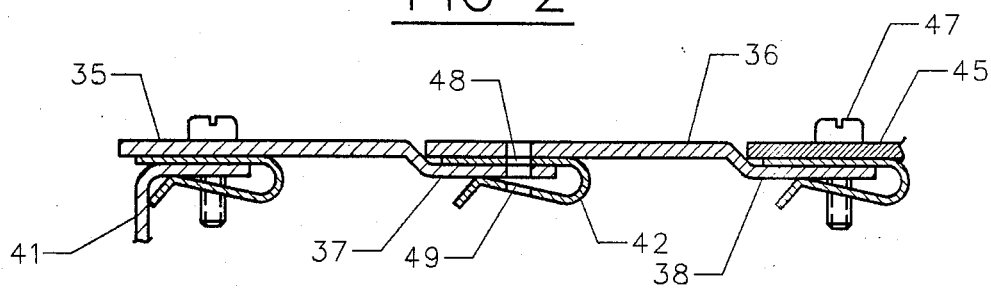
FIG. 3 is a cross-sectional view of a part of the integrated lighting panelboard and gutter assembly depicted in FIGS. 1 and 2.

The arrangement of the keyed trim plates 35, 36 to the left of the panelboard door 15, as viewed in FIG. 1, is depicted in FIG. 2. The integrated lighting panelboard and gutter assembly 10 is shown completely assembled with the door 15 and door flange 45 attached to rim 40 on the enclosure 11 on one side and attached to the offset edge 38 of the keyed trim plate 36 on the other side. The planar edge of keyed trim plate 35 is attached to offset edge 37 of keyed trim plate 36 on one side and to rim 41 of the modular enclosure on the other side. The door handle opening 44 is formed within the door for the installation of a door handle and lock to prevent unauthorized access to the panelboard interior.

To facilitate on-site field installation of the integrated lighting panelboard and gutter assembly, a plurality of self-tapping sheet metal screws 47 are used in place of the bolts described earlier with reference to FIG. 1 and a U-shaped metal clip 42 having a clearance hole 48 through one leg co-extensive with the clearance holes through the door flange 45 and the keyed trim plates 35, 36, and an undersized hole 49 through the other leg for engagement with the threads of the machine screws. One such clip is described as a "Tinnerman U-shaped fastener" supplied by Eaton Corporation, Whippany, N.J.

Figure 4:
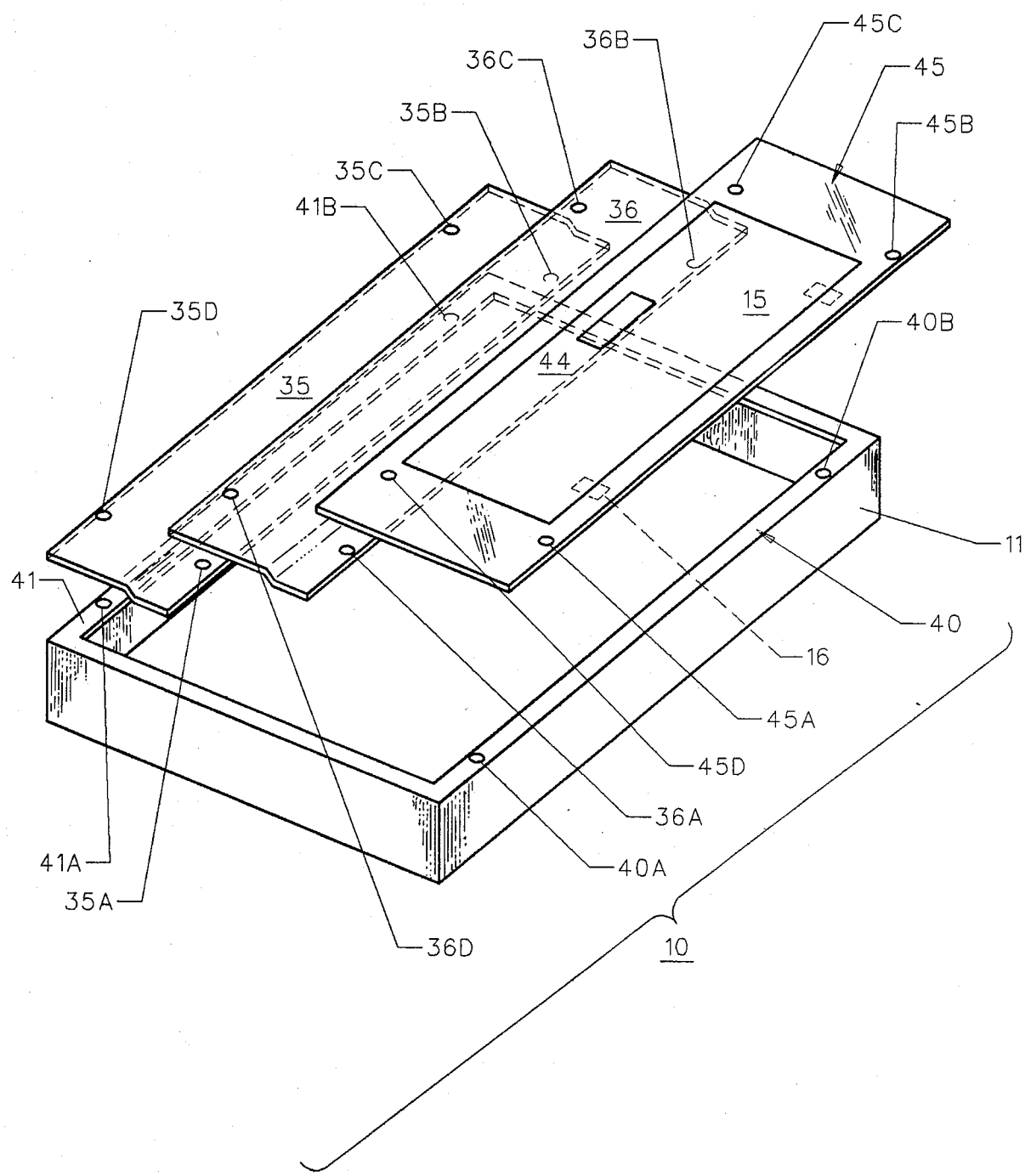
FIG. 4 is a top perspective view in isometric projection of the integrated lighting panelboard and gutter assembly depicted in FIGS. 1 and 2.

The assembly of the door 15 and the keyed trim plates 35, 36 to the modular enclosure 11 can best be seen by referring now to FIG. 4. The door flange 45, with the door attached, is positioned above the right side of the enclosure and the holes 45A, 45B are arranged in alignment with the holes 40A, 40B formed through the edge 40 of the enclosure. The holes 45C, 45D formed through the opposite side of door flange 45 are aligned with holes 36B, 36A formed through the right side of keyed trim plate 36. The holes 36C, 36D through the left side of keyed trim plate 36 are aligned with the holes 35B, 35A through the right side of the keyed trim plate 35, while the holes 35C, 35D through the left side of keyed trim plate 35 are aligned with the holes 41B, 41A formed through the edge 41 of the enclosure.

Figure 5:
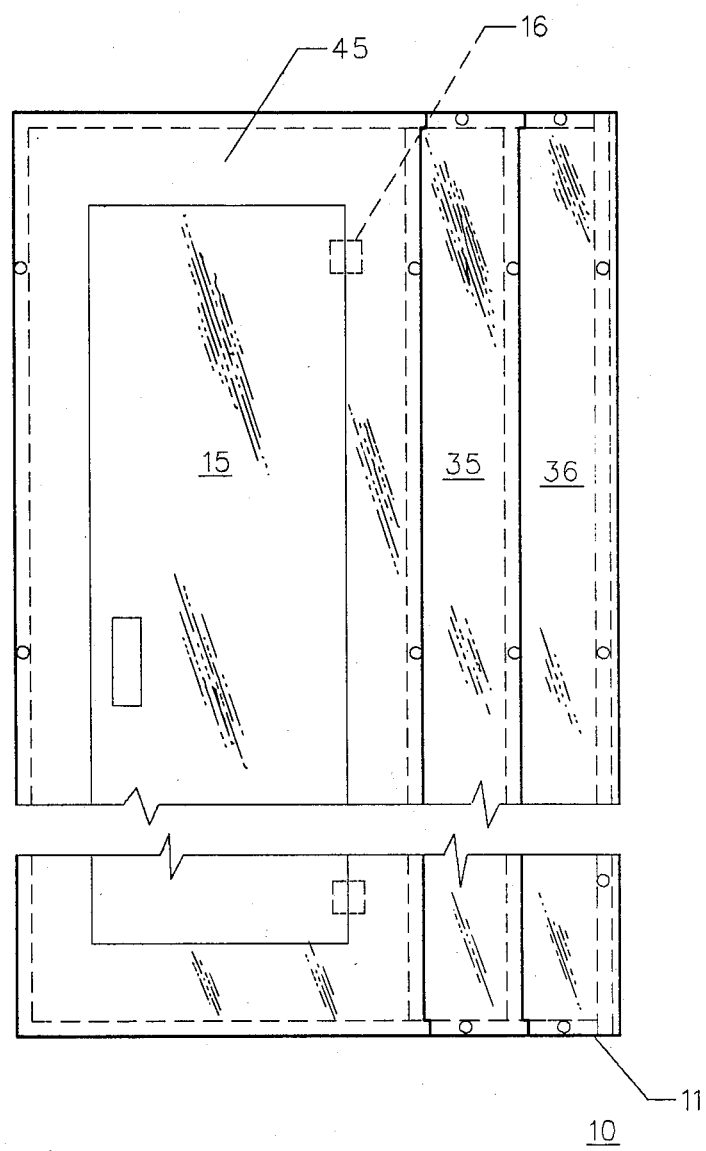
FIG. 5 is a front view of a second arrangement of the integrated lighting panelboard and gutter assembly, according to the invention.

The panelboard door 15 can be mounted on the left side of the modular enclosure 11 by placing the keyed trim plates 35, 36 on the right side as shown in FIG. 5, and attaching the door flange 45 and the attached door 15 to the left of the enclosure, as indicated.

Figure 6:
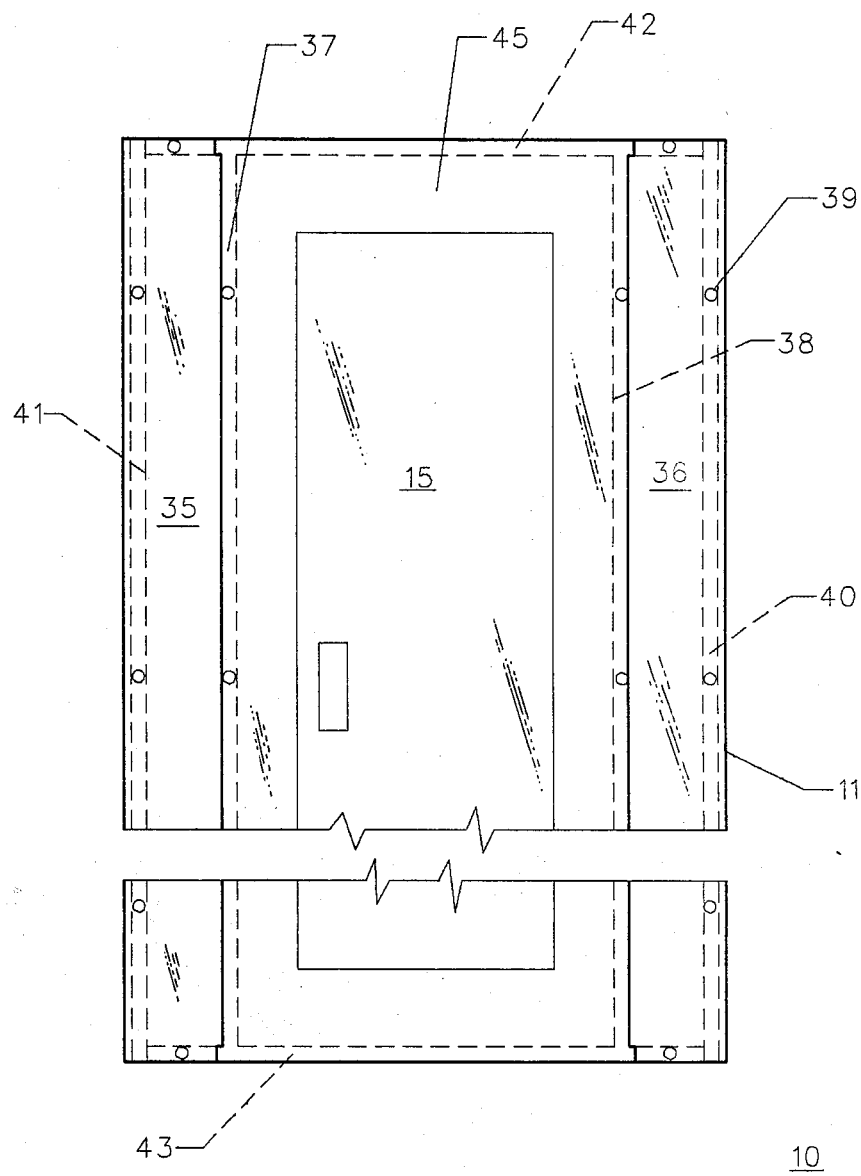
FIG. 6 is a front view of a third arrangement of the integrated lighting panelboard and gutter assembly, according to the invention.

When gutters are required on both sides of the panelboard interior, the arrangement shown in FIG. 6 is employed wherein the door flange 45 and the attached panelboard door 15 are centrally arranged on the enclosure and one of the shaped trim plates 35 is attached to the left side of the door flange and the shaped trim plate 36 is arranged on the right side, as indicated.

It has thus been shown that the distribution system wiring cables can be arranged within a common modular enclosure with the circuit breaker assembly by the arrangement of a pair of keyed trim plates in combination with a door flange and panelboard door for rapid and convenient on-site installation.

Having thus described my invention, what I claim as new and desire to secure by Letters Patent is:

1. An integrated electrical panelboard and wiring gutter assembly comprising:
   a rectangular enclosure including a bottom plate supporting a pair of first and second opposing sidewalls, said first and second sidewalls each terminating in an angled rim on a surface opposite said bottom plate;
   a rectangular door flange and door on said enclosure defining a first interior within said enclosure;
   circuit breaker support means carrying a plurality of circuit breakers within said first interior and attached to said bottom plate; and
   a first rectangular trim plate having a first planar edge and an opposing offset edge, both said first planar edge and said first offset edge including a pair of first apertures, said first rectangular trim plate being fastened to said first angled rim on said first planar edge and to said door flange on said first offset edge, said first rectangular trim plate thereby defining a second interior within said enclosure coextensive with said first interior for housing electrical power distribution cables.

2. An integrated electrical panelboard and wiring gutter assembly comprising:
   a rectangular enclosure including a bottom plate supporting a pair of first and second opposing sidewalls, said first and second sidewalls each terminating in an angled rim on a surface opposite said bottom plate;
   a rectangular door flange and door on said enclosure defining a first interior within said enclosure;
   circuit breaker support means carrying a plurality of circuit breakers within said first interior and attached to said bottom plate;
   a first rectangular trim plate having a first planar edge and an opposing offset edge, both said first planar edge and said first offset edge including a pair of first apertures, said first rectangular trim plate being fastened to said first angled rim on said first planar edge and to said door flange on said first offset edge, said first rectangular trim plate thereby defining a second interior within said enclosure coextensive with said first interior for housing electrical power distribution cables; and
   a second rectangular trim plate having a second planar edge and a second opposing offset edge, both said second planar edge and said second offset edge each including a pair of second apertures, said second rectangular trim plate being fastened to said second angled rim on said second planar edge and to said door flange on said second offset edge, said second rectangular trim plate thereby defining a third interior within said enclosure coextensive with said first and second interiors for housing said electrical power distribution cable.

3. An integrated electrical panelboard and wiring gutter assembly comprising:
   a rectangular enclosure including a bottom plate supporting a pair of first and second opposing sidewalls, said first and second sidewalls each terminatng in an angled rim on a surface opposite said bottom plate;
   a rectangular door flange and door on said enclosure defining a first interior within said enclosure;
   circuit breaker support means carrying a plurality of circuit breakers within said first interior and attached to said bottom plate; and
   a first rectangular trim plate having a first planar edge and an opposing offset edge, both said first planar edge and said first offset edge including a pair of first apertures, said first rectangular trim plate being fastened to said first angled rim on said first planar edge and to said door flange on said first offset edge, said first rectangular trim plate thereby defining a second interior within said enclosure coextensive with said first interior for housing electrical power distribution cables, said first rectangular trim plate and said door flange being bolted together.

4. An integrated electrical panelboard and wiring gutter assembly comprising:
   a rectangular enclosure including a bottom plate supporting a pair of first and second opposing sidewalls, said first and second sidewalls each terminating in an angled rim on a surface opposite said bottom plate;
   a rectangular door flange and door on said enclosure defining a first interior within said enclosure;
   circuit breaker support means carrying a plurality of circuit breakers within said first interior and attached to said bottom plate; and
   a first rectangular trim plate having a first planar edge and an opposing offset edge, both said first planar edge and said first offset edge including a pair of first apertures, said first rectangular trim plate being fastened to said first angled rim on said first planar edge and to said door flange on said first offset edge, said first rectangular trim plate thereby defining a second interior within said enclosure coextensive with said first interior for housing electrical power distribution cables, said first rectangular trim plate and said door flange being fastened together by means of an apertured U-shaped metal clip and a self-tapping screw.

5. An integrated electrical panelboard and wiring gutter assembly comprising:
 a rectangular enclosure including a bottom plate supporting a pair of first and second opposing sidewalls, said first and second sidewalls terminating in first and second angled rims on a surface opposite said bottom plate;
 a rectangular door flange and door on said enclosure defining a first interior within said enclosure;
 circuit breaker support means carrying a plurality of circuit breakers within said first interior and supported by said bottom plate;
 a first rectangular trim plate having a first planar edge and a first offset edge;
 a second rectangular trim plate having a second planar edge and a second offset edge, said door flange being fastened to said second rim on one side and to said second offset edge on an opposite side, said first planar edge being fastened to said first rim on one side and said first offset edge being fastened to said second planar edge on an opposite side to define a second interior within said enclosure for housing electrical power distribution cables.

6. An integrated electrical panelboard and wiring gutter assembly comprising:
 a rectangular enclosure including a bottom plate supporting a pair of first and second opposing side walls, said first and second side walls terminating in first and second rims on a surface opposite said bottom plate;
 a rectangular door flange and door on said enclosure defining a first interior within said enclosure;
 circuit breaker support means carring a plurality of circuit breakers within said first interior supported by said bottom plate;
 a first rectangular trim plate having a first planar edge and a first offset edge;
 a second trim plate having a second planar edge and a second offset edge;
 said second planar edge being fastened to said second rim on one side and said second offset edge being fastened to said door flange on an opposite side defining a second interior within said enclosure for housing electrical power distribution cables, said door flange being fastened to said second offset edge on one side and to said first offset edge on an opposite side over said first enclosure interior, said first planar edge being fastened to said first rim defining a third interior within said enclosure for housing additional electrical power distribution cables.

7. An integrated electrical panelboard and wiring gutter assembly comprising:
 a rectangular enclosure including a bottom plate supporting a pair of first and second opposing side walls, said first and second side walls terminating in first and second rims on a surface opposite said bottom plate;
 a rectangular door flange and door on said enclosure defining a first interior within said enclosure;
 circuit breaker support means carrying a plurality of circuit breakers within said first interior supported by said bottom plate;
 a first rectangular trim plate having a first planar edge and a first offset edge;
 a second trim plate having a second planar edge and a second offset edge;
 said second planar edge being fastened to said second rim on one side and said first offset edge being fastened to said second planar edge on an opposite side, said second offset end being fastened to one side of said door flange defining a second interior within said enclosure for housing electrical power distribution cables, an opposite side of said foor flange being fastened to said first rim.

8. The integrated electrical panelboard and wiring gutter assembly of claim 5, 6, or 7 including fastening means comprising a U-shaped metal clip having a machine screw clearance hole through one leg and having a hole through another leg smaller than said clearance hole for retaining said machine screw therein.

* * * * *